United States Patent

Ito et al.

[15] 3,666,840
[45] May 30, 1972

[54] POLYCARBOXY-TRIPHENYL PHOSPHATES

[72] Inventors: Ken Ito; Hiroshi Kaminaka, both of Toyonaka-shi; Norio Kotera, Amagasaki-shi; Hiroshi Kuruma, Toyonaka-shi; Yoshiro Murata, Minoo-shi, all of Japan

[73] Assignee: Sumitomo Chemical Company, Ltd., Osaka, Japan

[22] Filed: Sept. 2, 1969

[21] Appl. No.: 854,729

[30] Foreign Application Priority Data

Sept. 19, 1968 Japan..................................43/68097
Feb. 26, 1969 Japan..................................44/14945

[52] U.S. Cl...........................260/942, 260/521, 260/968, 260/983
[51] Int. Cl..........................................C07f 9/08, C07f 9/12
[58] Field of Search..................................260/942, 968, 983

[56] References Cited

FOREIGN PATENTS OR APPLICATIONS 1,122,521  1/1962  Germany..............................260/942

*Primary Examiner*—Joseph Rebold
*Assistant Examiner*—Richard L. Raymond
*Attorney*—Stevens, Davis, Miller & Mosher

[57] ABSTRACT

Polycarboxy-triphenyl phosphates are prepared by oxidizing corresponding polymethyltriphenyl phosphates. They are fire resistant and stable, and are useful not only as fire-retarding agents for high polymer materials but also as intermediates for various synthetic products. When these esters and hydrolyzed, corresponding aromatic hydroxycarboxylic acids can be obtained with advantages.

The polycarboxy-triphenyl phosphates have the formula:

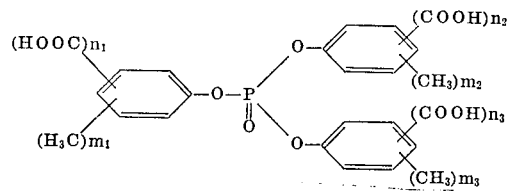

wherein $n_1$, $n_2$ and $n_3$ are individually zero or an integer of up to 2, and $n_1 + n_2 + n_3$ is 2 or more; $m_1$, $m_2$ and $m_3$ are individually zero or an integer of up to 2, and $n_1 + m_1$, $n_2 + m_2$ and $n_3 + m_3$ do individually not exceed 3; and the substituted positions of the carboxyl groups are in the 3-, 4- or 5-positions of the individual phenyl groups.

9 Claims, No Drawings

POLYCARBOXY-TRIPHENYL PHOSPHATES

This invention relates to novel polycarboxy-triphenyl phosphates and to a process for preparing aromatic hydroxycarboxylic acids therefrom.

The novel polycarboxy-triphenyl phosphates, which are provided in accordance with the present invention, are represented by the formula,

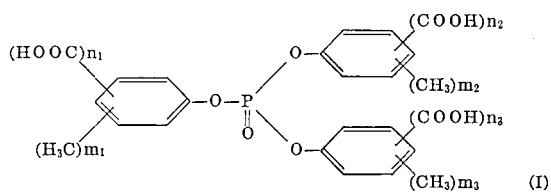

wherein $n_1$, $n_2$ and $n_3$ are individually zero or an integer of up to 2, and $n_1 + n_2 + n_3$ is 2 or more; $m_1$, $m_2$ and $m_3$ are individually zero or an integer of up to 2, and $n_1 + m_1$, $n_2 + m_2$ and $n_3 + m_3$ do individually not exceed 3; and the substituted positions of the carboxyl groups are selected from the 3-, 4- and 5- positions of individual phenol groups. (The novel polycarboxy-triphenyl phosphates will be referred to as "TPP-polycarboxylic acids," hereinafter.)

The TPP-polycarboxylic acids of the present invention are aromatic polycarboxylic acids having phosphate ester bonds in the molecules, and are novel compounds which have never been disclosed in the known literature. The TPP-polycarboxylic acids have many such excellent properties, e.g. they are high in melting point, in general, stable to heat, difficultly inflammable and self-extinguishable, and the phosphate ester bonds in the molecules thereof are also relatively stable to hydrolysis. By virtue of these excellent properties, the TPP-polycarboxylic acids are particularly suitable as constituents of synthetic resins, synthetic fibers and other high polymer substances, which are required to be heat resistant and fire resistant, and as various processing agents for imparting fire resistance or flame resistance to common synthetic resins, natural and synthetic fibers, etc.

The TPP-polycarboxylic acids are also valuable as intermediates for aromatic carboxylic acids, and it has been found that when they are hydrolyzed, hydroxyphenyl carboxylic acids can be obtained with advantages.

The TPP-polycarboxylic acids represented by the formula (I) are prepared by oxidizing corresponding polymethyl-triphenyl phosphates.

As to the oxidation of esters of alkylphenols with molecular oxygen, nothing has heretofore been known except the oxidation of acetate esters of cresol. Tolyl acetate can be easily synthesized and one which is high in purity is readily obtainable. On the other hand, however, the tolyl acetate is not sufficient in resistance to hydrolysis during oxidation reaction, and has the drawback that a part thereof is hydrolyzed with water formed during the reaction to give a free phenolic compound, which frequently disturb the progress of reaction. Accordingly, the oxidation thereof must to be discontinued at a low conversion, or various countermeasures should be taken so as not to cause the stoppage of reaction.

Noticing the stability of esters of aromatic phosphoric acids, the present inventors made various studies to find that methyl groups linked to the aromatic nuclei of esters of aromatic phosphoric acids easily undergo oxidation, but ester bonds linked to phosphoric acids are relatively stable to hydrolysis under oxidation conditions and there occurs no such hydrolysis as to disturb the oxidation.

The present invention has been developed on the basis of the above-mentioned new finding.

It is therefore the objects of the present invention to provide novel and useful TPP-polycarboxylic acids formed by oxidation of methylphenyl phosphates, and to provide a novel process for preparing aromatic hydroxycarboxylic acids by hydrolyzing said TPP-polycarboxylic acids.

In accordance with the present invention, the TPP-polycarboxylic acids represented by the formula (I) are prepared by oxidizing polymethyl-triphenyl phosphates of the formula,

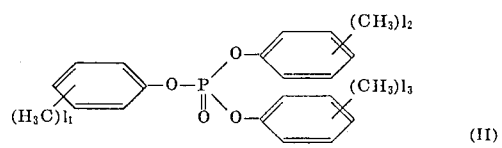

wherein $l_1$, $l_2$ and $l_3$ are individually zero or an integer of up to 3, and $l_1 + l_2 + l_3$ is 2 or more; and at least 2 of the methyl groups have been substituted in the 3-, 4- or 5-positions of the phenyl groups.

Further, in accordance with the present invention, various aromatic hydroxycarboxylic acids are prepared by the hydrolysis of the TPP-polycarboxylic acids of the formula (I).

Examples of the TPP-polycarboxylic acids provided according to the present invention include:

3,3′,3″-Tricarboxy-triphenyl phosphate,
4,4′,4″-Tricarboxy-triphenyl phosphate,
3,3′,4″-Tricarboxy-triphenyl phosphate,
3,4′,4″-Tricarboxy-triphenyl phosphate,
2-Methyl-3′,3″-dicarboxy-triphenyl phosphate,
2-Methyl-3′,4″-dicarboxy-triphenyl phosphate,
2-Methyl-4′,4″-dicarboxy-triphenyl phosphate,
3-Methyl-3′,3″-dicarboxy-triphenyl phosphate,
3-Methyl-3′,4″-dicarboxy-triphenyl phosphate,
3-Methyl-4′,4″-dicarboxy-triphenyl phosphate,
4-Methyl-3′,3″-dicarboxy-triphenyl phosphate,
4-Methyl-3′,4″-dicarboxy-triphenyl phosphate,
4-Methyl-4′,4″-dicarboxy-triphenyl phosphate,
3,3′-Dicarboxy-triphenyl phosphate,
3,4′-Dicarboxy-triphenyl phosphate,
4,4′-Dicarboxy-triphenyl phosphate
2,2′,2″-Trimethyl-3,3′,3″-tricarboxy-triphenyl phosphate,
2,2′,2″,3-Tetramethyl-3′,3″-dicarboxy-triphenyl phosphate,
2,2′,2″-Trimethyl-4,4′,4″-tricarboxy-triphenyl phosphate,
2,2′,2″-4-Tetramethyl-4′,4″-dicarboxy-triphenyl phosphate,
2,2′,2″-Trimethyl-5,5′,5″-tricarboxy-triphenyl phosphate,
2,2′,2″,5-Tetramethyl-5′,5″-dicarboxy-triphenyl phosphate,
3,3′,3″,4,4′,4″-Hexacarboxy-triphenyl phosphate,
3-Methyl-3′,3″,4,4′,4″-pentacarboxy-triphenyl phosphate,
3,3′-Dimethyl-3″,4,4′,4″-tetracarboxy-triphenyl phosphate,
3,3′,3″-Trimethyl-4,4′,4″-tricarboxy-triphenyl phosphate,
3,3′,3″,4-Tetramethyl-4′,4″-dicarboxy-triphenyl phosphate,
3,3′,3″,5,5′,5″-Hexacarboxy-triphenyl phosphate,
3-Methyl-3′,3″,5,5′,5″-pentacarboxy-triphenyl phosphate,
3,3′-Dimethyl-3″,5,5′,5″-tetracarboxy-triphenyl phosphate,
3,3′,3″-Trimethyl-5,5′,5″-tricarboxy-triphenyl phosphate,
3,3′,3″,5-Tetramethyl-5′,5″-dicarboxy-triphenyl phosphate,
2,2′-Dimethyl-3,3′-dicarboxy-triphenyl phosphate,
2,2′-Dimethyl-4,4′-dicarboxy-triphenyl phosphate,
2,2′-Dimethyl-5,5′-dicarboxy-triphenyl phosphate,
3,3′,4,4′-Tetracarboxy-triphenyl phosphate,
3-Methyl-3′,4,4′-tricarboxy-triphenyl phosphate,
3,3′-dimethyl-4,4′-dicarboxy-triphenyl phosphate,
3,3′,5,5′-Tetracarboxy-triphenyl phosphate,
3-Methyl-3′,5,5′-tricarboxy-triphenyl phosphate,
3,3′-Dimethyl-5,5′-dicarboxy-triphenyl phosphate,
3,5-dicarboxy-triphenyl phosphate,
2,2′,2″,6,6′,6″-Hexamethyl-4,4′,4″-tricarboxy-triphenyl phosphate, 2,2',4'',4''',6,6',6''-Heptamethyl-4,4'-dicarboxy-triphenyl phosphate,
2,2',2''-Trimethyl-3,3'-dicarboxy-triphenyl phosphate,
2,2',2''-Trimethyl-4,4'-dicarboxy-triphenyl phosphate,
2,2',2''-Trimethyl-5,5'-dicarboxy-triphenyl phosphate,
2-Methyl-3'',3''',4',4''-tetracarboxy-triphenyl phosphate,
2,3'-Dimethyl-3'',4',4''-tricarboxy-triphenyl phosphate,
2,3',3''-Trimethyl-4',4''-tricarboxy-triphenyl phosphate,
2-Methyl-3'',3''',5',5''-tetracarboxy-triphenyl phosphate,
2,3'-Dimethyl-3'',5',5''-tricarboxy-triphenyl phosphate,
2,3',3''-Trimethyl-5',5''-tricarboxy-triphenyl phosphate,
2,2'-Dimethyl-3,3',3''-tricarboxy-triphenyl phosphate,
2,2',3-Trimethyl-3',3''-dicarboxy-triphenyl phosphate,
2,2',3''-Trimethyl-3,3'-dicarboxy-triphenyl phosphate,
2,2'-Dimethyl-3'',4,4'-tricarboxy-triphenyl phosphate,
2,2',3''-Trimethyl-4,4'-dicarboxy-triphenyl phosphate,
2,2',4-Trimethyl-3'',4'-dicarboxy-triphenyl phosphate,
2,2'-Dimethyl-3'',5,5'-tricarboxy-triphenyl phosphate,
2,2',3''-Trimethyl-5',5''-dicarboxy-triphenyl phosphate,
2,2',5-Trimethyl-3,5'-dicarboxy-triphenyl phosphate,
3,3',3'',4,4'-Pentacarboxy-triphenyl phosphate,
3-Methyl-3',3'',4,4'-Tetracarboxy-triphenyl phosphate,
3-Methyl-3',3'',4',4''-tetracarboxy-triphenyl phosphate,
3,3'-Dimethyl-3'',4,4'-tricarboxy-triphenyl phosphate,
3,3'-Dimethyl-3'',4,4''-tricarboxy-triphenyl phosphate,
3,3',3''-trimethyl-4,4'-dicarboxy-triphenyl phosphate,
3,3',4-trimethyl-3'',4'-dicarboxy-triphenyl phosphate,
3,3',3'',5,5'-Pentacarboxy-triphenyl phosphate,
3-Methyl-3',3'',5,5'-tetracarboxy-triphenyl phosphate,
3-Methyl-3',3'',5',5''-tetracarboxy-triphenyl phosphate,
3,3'-dimethyl-3'',5,5'-tricarboxy-triphenyl phosphate,
3,3'-Dimethyl-3'',5,5'-tricarboxy-triphenyl phosphate,
3,5-Dimethyl-3',3'',5'-tricarboxy-triphenyl phosphate,
3,3',3''-Trimethyl-5,5'-tricarboxy-triphenyl phosphate,
3,3',5-Trimethyl-3'',5'-tricarboxy-triphenyl phosphate,
2,2'-Dimethyl-3'',5''-dicarboxy-triphenyl phosphate,
3,3',3'',5''-tetracarboxy-triphenyl phosphate,
3-Methyl-3',3'',5-tricarboxy-triphenyl phosphate,
3-Methyl-3',3'',5'-tricarboxy-triphenyl phosphate,
3,3'-Dimethyl-3'',5-dicarboxy-triphenyl phosphate,
3,5-Dimethyl-3',3''-dicarboxy-triphenyl phosphate,
3,3'-Dimethyl-3'',5''-dicarboxy-triphenyl phosphate,
3,3',5'-Tricarboxy-triphenyl phosphate,
3-Methyl-3',5-dicarboxy-triphenyl phosphate,
3-Methyl-3',5'-dicarboxy-triphenyl phosphate,
2,6-Dimethyl-3',3''-dicarboxy-triphenyl phosphate,
2,2',2'',6-Tetramethyl-4',5''-dicarboxy-triphenyl phosphate, and substituted isomers and mixtures thereof.

These TPP-polycarboxylic acids can be prepared by oxidizing corresponding polymethyl-triphenyl phosphates. For example, when tri (m-tolyl) phosphate is oxidized, 3,3',3''-tricarboxy-triphenyl phosphate is chiefly obtained. Further, when bis (3,4-xylyl) monophenyl phosphate is oxidized, there is obtained a mixture comprising dicarboxylic acids such as 3,3'-dimethyl-4,4'-dicarboxy-triphenyl phosphate, tricarboxylic acids such as 3-methyl-3',4,4'-tricarboxy-triphenyl phosphate, and tetracarboxylic acids such as 3,3',4,4'-tetracarboxy-triphenyl phosphate. If necessary, the mixture can be separated into individual components.

When the TPP-polycarboxylic acids of the formula (I) are hydrolyzed, corresponding aromatic hydroxycarboxylic acids are obtained. Generally, aromatic hydroxycarboxylic acids are important compounds as starting materials and intermediates for production of synthetic fibers, synthetic resins, synthetic dyes, medicines, agricultural chemicals, high polymer-processing agents, etc. Among these, some compounds have already been prepared on commercial scale and have been used in large quantities. On the other hand, not a few of them have not yet been utilized widely, despite the fact that their usefulness has been confirmed, because no synthesis process suitable for commercial scale production thereof has been established.

The aromatic hydroxycarboxylic acids obtained according to the present process are those corresponding to the structures of TPP-polycarboxylic acids of the formula (I), and represented by the formulas,

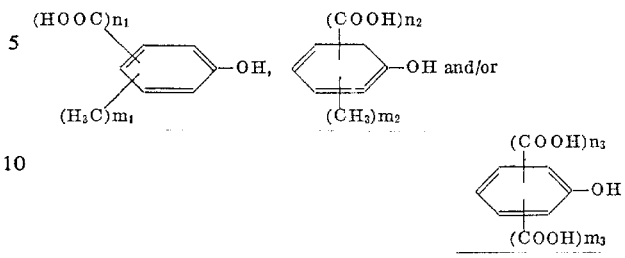

wherein $m_1$, $m_2$, $m_3$, $n_1$, $n_2$ and $n_3$ are as defined previously.

It is needless to say that the polymethyl-triphenyl phosphates employed as starting materials in the present invention should have such structures that the carboxyl groups of the desired TPP-polycarboxylic acids have been replaced by methyl groups. For example, in order to obtain 4,4',4''-tricarboxy-triphenyl phosphate, it is necessary to use tri (p-tolyl) phosphate as the starting material. Methyl groups, which have been substituted in the orthopositions, i.e. the 2- or 6-position, are extremely slow in rate of oxidation, and there are some cases where they can be regarded as being substantially not oxidized. Accordingly, the starting polymethyl-triphenyl phosphates should be those which have at least two methyl groups in the 3-, 4- or 5-position of the three phenyl groups. (Hereinafter, the methyl groups in the 3-, 4- or 5-position will sometimes be referred to as "oxidizable methyl groups" so as to be distinguishable from those in the 2- or 6-position.)

A general process for synthesizing phenyl phosphate esters and derivatives thereof is well known. It is also well known that some of said esters and derivatives are produced in large quantities on commercial scale and are supplied at economical costs to various application fields. From such commercially available triphenyl phosphate ester derivatives, those which conform to the object of the invention may be selected. For example, a phosphate ester, which is sold under the trade name Tricresyl Phosphate (TCP), is ordinarily synthesized by reacting a tar-acid fraction called metacresilic acid with phosphorus oxychloride, and has widely been used as plasticizers, fire retardants and petroleum additives. In the case of such commercially available TCP, the tar-acid, which is a starting material for the synthesis thereof, usually contains many kinds of components such as phenol and isomers of xylenol, and other alkylphenols, in addition to 3 kinds of cresol isomers. Accordingly, TCP itself, which is synthesized from the tar-acid, is extremely complex in composition, in most cases. Even such TCP may be used as the starting material in the present invention, as long as at least 2 oxidizable methyl groups are substantially present in one molecule. It is, however, needless to say that in the above case, the resulting TPP-polycarboxylic acid and aromatic hydroxycarboxylic acid obtained by hydrolyzing the same are mixtures, which are complex in composition resulting from to the compositions of the starting materials.

In order to obtain TPP-polycarboxylic acids specific in structure, it is necessary to use, as the starting materials, polymethyl-triphenyl phosphates which correspond thereto in structure. The synthesis of polymethyl-triphenyl phosphates having such specific structures can also be effected easily according to a known process. For example, about 3 moles of m-cresol is allowed to react with 1 mole of phosphorus oxychloride in the presence of aluminum chloride as a catalyst to obtain 3,3',3''-trimethyl-triphenyl phosphate, which is used as a starting material for 3-methyl-3',3''-dicarboxy-triphenyl phosphate and/or 3,3',3''-tricarboxy-triphenyl phosphate. Further, for the preparation of 4,4'-dimethyl-triphenyl phosphate, there is adopted a 2-stage reaction process, in which about 1 mole of phenol is allowed to react with 1 mole of phosphorus oxychloride and the resulting (mono)phenylphosphoric acid dichloride is reacted, if necessary after purification by rectification or the like operation, with about 2 moles of p-cresol. The order of stages in the above process may be reversed. Likewise, phenyl p-tolyl 2,4-xylyl phosphate of the formula

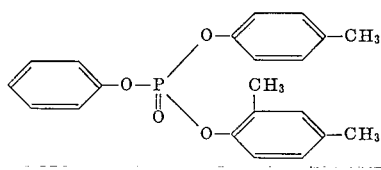

etc. can be synthesized according to a 3-stage process.

It is, of course, possible to synthesize a mixture of specific polymethyl-triphenyl phosphates. For example, about 3 moles of a mixture of m- and p-cresol isomers is allowed to react with 1 mole of phosphorus oxychloride to give a mixture comprising 3,3′,3″-trimethyl-triphenyl phosphate, 3,3′,4″-trimethyl-triphenyl phosphate, 3,4′,4″-trimethyl-triphenyl phosphate and 4,4′,4″-trimethyl-triphenyl phosphate.

The polymethyl-triphenyl phosphates obtained in the above-mentioned manner are subjected to oxidation reaction, whereby part or all of the oxidizable methyl groups thereof are converted to carboxyl groups. The starting polymethyl-triphenyl phosphates, which are fed to oxidation reaction systems, are desirably those containing not more than 0.1 percent of free phenolic compounds.

The free phenolic compounds can be easily removed according to a known procedure such as washing with aqueous alkali solution, distillation or the like.

The oxidation of polymethyl-triphenyl phosphates can be effected by use of such oxidizing agents as molecular oxygen, organic and inorganic peroxides, permanganate, bichromate, nitric acid, ozone, halogens, halogeno-acids, etc. However, in the oxidation of this kind of compounds, which have phosphate ester bonds in the molecules, the influence of hydrolysis is inevitably brought about to lower the yields of TPP-carboxylic acids, if they are contacted with water for a long period of time under strongly acidic, strongly basic, elevated temperature or the like severe conditions, though the ester bonds thereof are relatively stable to hydrolysis. In order to overcome such difficulty, there may be adopted a process, in which said compounds are treated with the oxidizing agents in a non-aqueous solvent. For example, a process, in which the compounds are treated in pyridine with permanganates as oxidizing agents, is recommendable. It is also effective to remove, according to a suitable procedure, water formed due to oxidation of the methyl groups of said compounds.

For commercial scale oxidation, it is advantageous to use as the oxidizing agent molecular oxygen gas or an oxygen-containing gas such as air. Particularly, the so-called "liquid phase air oxidation," in which the starting aromatic phosphate esters are oxidized with said oxygen-containing gas, is one of the most excellent modes of practice of the present invention. The oxidation step of the present invention will be explained below with respect chiefly to the "liquid phase air oxidation."

Molecular oxygen or an oxygen-containing gas such as air, which is used in the oxidation, should be protected as far as possible from contamination by substances which tend to disturb the oxidation or promote the hydrolysis of said esters, e.g. sulfur compounds, phenolic substances, moisture, strong acids and strong alkalis.

Most of the aromatic phosphate esters are relatively stable to hydrolysis. Under severe conditions, however, the influence of hydrolysis due to contaminating moisture or to water formed during the oxidation reaction is not negligible. It is therefore important to select such reaction conditions that the rate of hydrolysis is sufficiently lower than the rate of oxidation reaction. The reaction temperature is within the range of from room temperature to 200° C., preferably from 60° to 150° C. At temperatures above 200° C., the influence of hydrolysis of the phosphate esters is so great that not only are no favorable results attained but also stoppage of the oxidation reaction is frequently brought about. The reaction pressure is advantageously atmospheric or an elevated pressure, and is ordinarily within the range of from atmospheric pressure to 30 Kg/cm² (gauge). In order to promote the oxidation reaction, there are used catalysts containing vanadium, chromium, manganese, cobalt, nickel, copper or molybdenum. These catalysts are advantageously used in a form capable of being uniformly dissolved or dispersed in the reaction systems. It is also advantageous for the effective practice of the present invention to use in combination, as cocatalysts and/or promotors, various halides such as bromide and the like; organic carbonyl compounds such as acetaldehyde and methylethylketone; various peroxides such as benzoyl peroxide and peracetic acid; and ozone.

For the inhibition of hydrolysis, it is a preferable procedure to remove water in the oxidation reaction system. This procedure is particularly effective in the case where TPP-polycarboxylic acids having a large number of carboxyl groups, because in said case, the reaction conditions tend to become severe and the amount of water formed is large. Examples of dehydration procedures are the addition of a substance capable of co-boiling with water, e.g. benzene; the addition of a substance capable of reacting with water, e.g. acetic anhydride; and the use of a substance capable of adsorbing water, e.g. molecular sieve.

As the reaction solvent, there is used an inert compound capable of uniformly dissolving or dispersing the starting aromatic phosphate ester and the catalyst. Preferable solvent is a lower aliphatic carboxylic acid, e.g. acetic, propionic or butyric acid, an anhydride thereof or a mixture of these acids.

The reaction time considerably varies depending on the kinds of starting aromatic phosphate ester and on the desired TPP-polycarboxylic acid. However, the reaction conditions should be so chosen that the reaction is substantially complete is a period within the range of from about 4 to 24 hours, excluding the induction period. If the reaction time is longer than 24 hours, the influence of hydrolysis and other side reactions becomes great. When suitable reaction conditions are selected, the reaction can be sufficiently completed within said hours. The oxidation can be stopped before completion of the reaction. In this case, however, unreacted starting aromatic phosphate ester, monocarboxylic acid and other low oxidation degree product are left in large amounts to bring about the drawback that the after-stage operations become complex.

The oxidizability of the methyl groups of polymethyl-triphenyl phosphates greatly varies depending on the substituted positions thereof. That is, methyl groups, which have been substituted in the 2- and 6-positions of phenyl groups, are quite difficultly oxidizable due to their steric configuration. In this case, it may be said that no substantial oxidation takes place. In contrast to this, methyl groups, which have been substituted in the 3-, 4- and 5-positions of phenyl groups, are easily oxidizable and are substantially the same in oxidizability. However, in the case of two methyl groups, which have been substituted in the 3- and 4-positions of same phenyl nucleus, the methyl group in the 4-position is more easily oxidizable. Accordingly, when tris(2,4-xylyl) phosphate, for example, is oxidized, 2,2′,2″-trimethyl-4,4′,4″-tricarboxy-triphenyl phosphate is chiefly formed and, depending on conditions, 2,2′,2″,4-tetramethyl-4′,4″-dicarboxy-triphenyl phosphate is formed in a somewhat large amount, but the amount of 2-carboxy(-substituted) compounds formed is very slight. In the oxidation of phenylbis-(3,4-xylyl) phosphate, there are formed dicarboxylic and tricarboxylic acids, in addition to 3,3′,4,4′-tetracarboxy-triphenyl phosphate. However, in the former, i.e. in the dicarboxylic and tricarboxylic acids, methyl groups left unoxidized are chiefly those in the 3-positions of phenyl groups, and residual methyl groups in the 4-positions are far less in number.

Procedures for recovering the product TPP-poly-carboxylic acids from oxidation reaction liquids are more or less different depending on the kind of the carboxylic acids, and therefore the procedures are somewhat individual in details. Generally, however, the recovery is advantageously effected in the following manner:

In a few cases where the TPP-polycarboxylic acid formed is relatively difficultly soluble and can be easily taken out of the reaction mixture, e.g. in case the reaction mixture containing (3,3',3''-tricarboxy)triphenyl phosphate, (4,4',4''-tricarboxy)triphenyl phosphate and (3,3',5,5'B-tetracarboxy)triphenyl phosphate, the reaction mixture is subjected, either as it is or after removal by distillation of a more or less amount of the solvent, to filtration to separate a precipitate, whereby a major portion of the product can be taken out. The filtrate is further subjected to repeated concentration and filtration or is treated according to the treatment of an easily-soluble product. In case the desired TPP-polycarboxylic acid is easily soluble in solvent or in the case where the product dissolved in the filtrate formed by filtering off difficultly soluble products, it is general to adopt such procedures that the reaction solvent is removed by distillation or the like means, inorganic residues such as oxidizing agent, catalyst, etc. are removed by such procedure as extraction, precipitation, filtration or ion-exchange, and then the remaining TPP-polycarboxylic acid is separated and purified. The distillation of solvent and the removal of inorganics may be effected in the reverse order. If necessary the above operations may be repeated two or more times.

The thus obtained TPP-polycarboxylic acids are white crystals light in weight and are colorless and odorless, in general. In flames, they melt without causing decomposition or carbonization. When heated to above 500° C., they are gradually decomposed, and the decomposates sometimes cause combustion but the combustion immediately ceases by removal of the flame.

Solubilities of the TPP-polycarboxylic acids for water and various organic solvents greatly vary depending on the kind thereof. Generally, the acids are sparingly soluble in cold water and are easily soluble in alcohols such as methanol, ethanol, etc. They are somewhat less soluble in acetic acid and ethyl acetate than in alcohols, and are soluble, to some extent as between said two kinds of solvents, in ketones such as acetone, methylethylketone, etc. They are further low in solubility in aromatic hydrocarbons such as benzene, toluene, etc. and aliphatic hydrocarbons such as n-hexane, etc., but most of them are soluble in N,N-dimethylformamide and dimethylsulfoxide.

As is clear from the above explanation, the TPP-polycarboxylic acids can be prepared with relative ease from starting materials, which are obtainable at low costs and in large quantities, i.e. phosphorus oxychloride and such phenols as phenol, cresol isomers, xylenol isomers, trimethylphenol isomers and mixtures thereof. Moreover, the TPP-polycarboxylic acids have such excellent characteristics as being difficultly combustible, stable and heat resistant, and hence are substances extremely high in value not only as processing agents for various synthetic high polymer substances and various polymer substances, which are required to be difficultly combustible, flame resistant and heat resistant, e.g. fire-retarding agents, plasticizers, crosslinking agents, water-repelling agents, etc., but also in various chemical products such as vehicles for paints, surface active agents, additives for lubricating oils, etc.

The novel TPP-polycarboxylic acids thus formed through the above-mentioned oxidation are subjected, in accordance with the present process, to hydrolysis to give hydroxyphenyl carboxylic acids. That is, the oxidized reaction liquid which has completed the reaction is freed from the solvent by distillation and is then subjected to hydrolysis. If the desired oxidation product carboxyphenyl phosphate ester has deposited prior to the removal of solvent by distillation, the said ester may be separated by filtration and the hydrolysis treatment may be effected separately. As the removal of solvent by distillation progresses, further deposition of product is observed, and therefore, there may be adopted such procedures that the concentration operation is ceased at a suitable stage and the precipitate is separated by filtration. In the filtrate have been concentrated unreacted phosphate ester, intermediary oxidation products of phosphate ester (including partial oxidation products in which a part of the three to six methyl groups of phosphate ester have converted to carboxyl groups), and more or less amounts of hydrolyzates and by-products.

The separation and recovery of catalyst may be effected either before or after the hydrolysis. The catalyst may be separated and recovered according to, for example, any of such procedures that it is recovered as a reaction solvent-soluble salt; it is dissolved in a mineral acid and is separated; it is formed into a basic and insoluble oxide or hydroxide and is separated by filtration; and it is separated as a complex salt. Among these, suitable procedures in connection with the hydrolysis step may be effected either independently or in combination.

The hydrolysis is carried out in the presence of mineral acids or basic substances. Carboxyphenyl phosphate esters to be fed to the hydrolysis step include not only high purity esters which have been subjected to purification but also crude esters obtained by filtration and separation from oxidation reaction liquids or by removal of solvents therefrom by distillation. In case a basic substance has been used, it is recovered, after the hydrolysis, by liberating the product according to such procedure as acidification or the like. The hydrolysis reaction is effected at a temperature of 50° to 300° C. under a pressure of atmospheric to 100 Kg/cm$^2$ (gauge).

Typical examples of the aromatic hydroxycarboxylic acids obtainable according to the present process include, m-hydroxybenzoic acid, p-hydroxybenzoic acid, 3-hydroxyphthalic acid, 4-hydroxyphthalic acid, 5-hydroxyisophthalic acid, 4-hydroxy-m-toluic acid, 3-hydroxy-p-toluic acid, 3-hydroxy-o-toluic acid, 4-hydroxy-o-toluic acid, 5-hydroxy-m-toluic acid, 3,5-dimethyl-p-hydroxybenzoic acid and mixtures thereof.

From the hydrolysis reaction mixture, there are sometimes recovered, in addition to the said aromatic hydroxycarboxylic acids, more or less quantities of un oxidized phenolic compounds such as phenol, cresols, or xylenols.

The present invention will be illustrated in detail below, but it is needless to say that the examples do not limit the scope of the invention. In the examples, all the units are parts by weight unless otherwise specified.

EXAMPLE 1

10 Parts of cobaltous acetate (tetraaquo-salt) and 4.4 parts of acetaldehyde were added to 300 parts of glacial acetic acid. The mixture was heated to 90° C. in a cylindrical reactor and was vigorously stirred for 40 minutes while introducing oxygen gas. By this operation, the mixture was changed in color from the initial reddish purple through brown to green, and showed that the cobaltous ion had substantially converted to a cobaltic ion. This mixture was cooled to 70° C. and was charged with a mixture comprising 41 parts of tri (m-tolyl) phosphate and 49 parts of glacial acetic acid. Subsequently, the mixture was stirred at 70°– 75° C. for 9 hours, while introducing oxygen gas. During this period, 0.022 part/min. of acetaldehyde was added to the reaction mixture. After 3 hours from initiation of the reaction, cooling became necessary due to generation of heat, and the system was cooled with water for about 4 hours. At about 4.5th hour after initiation of the reaction, a product began to deposit and, at the 7th hour, unreacted tri (m-tolyl) phosphate completely disappeared. The reaction liquid was cooled to room temperature and was then filtered to obtain 38 parts of a crystal of crude 3,3',3''-tricarboxy-triphenyl phosphate. It was observed that in the filtrate had been still dissolved, in addition to the catalyst cobalt salt, small amounts of 3,3',3''-tricarboxy-triphenyl phosphate and cobalt salt thereof, and more or less amounts of by-products and intermediary oxides.

The crude 3,3',3''-tricarboxy-triphenyl phosphate was heated for 1 hour together with 3 times the amount thereof of acetic acid to dissolve and remove slight amounts of cobalt and soluble impurities, and was then recrystallized from an equal volume mixed solution of ethanol and water to obtain a white crystal having a melting point of 262° C.

Elementary analysis for $C_{21}H_{15}O_{10}P$:
Found:      C 55.26%,   H 3.30%,    P 6.77%
Calculated: C 55.03%,   H 3.30%,    P 6.76%

According to infrared absorption spectrum, there was confirmed the presence of absorptions of 1,710 cm$^{-1}$ and 3,000 – 2,500 cm$^{-1}$, which were inferred to be ascribable to the carboxyl groups.

EXAMPLE 2

50 Parts of tri(p-tolyl) phosphate and 1 part of manganese naphthenate were added to a mixed liquid comprising 100 parts of glacial acetic acid and 40 parts of acetic anhydride. Subsequently, the mixture was oxidized with oxygen at 140° C. under a pressure of 6 Kg/cm$^2$ (gauge). After an induction period of about 3 hours, the absorption of oxygen became vigorous and, after 24 hours, the starting tri(p-tolyl) phosphate was not left except in a trace amount. The reaction liquid was cooled, and a deposited crystal was separated by filtration to obtain 35 parts of a crude crystal. From the filtrate, acetic acid was removed by distillation to obtain 30 parts of a residue. The filtration cake was recrystallized from water-ethanol to obtain 32 parts of a white crystal having a melting point of 248° C. The crystal was heated in ethyl acetate to elute small amounts of impurities (this component is referred to as component A) migrated therein, whereby a crystal having a melting point of 261.7° – 262.5° C. was obtained. In the nuclear magnetic resonance spectrum of DMSO-$d_6$ solution of said crystal, no absorption of unreacted methyl groups was observed. Further, the elementary analysis values of said crystal were as set forth below. From these results, it was decided that said crystal was 4,4',4''-tricarboxytriphenyl phosphate.

Elementary analysis for $C_{21}H_{15}O_{10}P$:
Found:      C 54.89%,   H 3.29%
Calculated: C 55.03%,   H 3.30%

The vaporization residue of the filtrate was heated together with methylisobutylketone to extract solubles, which were then recrystallized to obtain 12 parts of a solid having a melting point of about 135° C. This solid was a substantially equal amount mixture of the aforesaid component A and 4,4',4''-tricarboxy-triphenyl phosphate. The former was separated according to column chromatography and, for the results of the nuclear magnetic resonance spectrum (in acetone-$d_6$ solvent) of the remaining substance, it was decided that said substance was 4-methyl-4',4''-dicarboxy-triphenyl phosphate. The melting point of this substance was 187° C.

EXAMPLE 3

1 Mole of phosphorus oxychloride was allowed to react with 1 mole of phenol in the presence of anhydrous aluminum chloride. The resulting monophenyl dichlorophosphate was separated by distillation and was then allowed to react with 2 moles of m-cresol, using anhydrous aluminum chloride as a catalyst, to obtain 3,3'-dimethyl-triphenyl phosphate. 71 Parts of this phosphate was oxidized for 7 hours in the same manner as in Example 1, whereby the residual amount of the starting 3,3'-dimethyl-triphenyl phosphate became less than 0.1 percent. The reaction mixture had maintained a homogeneous phase, and therefore acetic acid was removed by distillation and the residue was dissolved in water together with sodium hydrogencarbonate. After heating the solution at about pH 8 for 10 minutes, a cobalt hydroxide formed was separated by filtration. To the filtrate was added sulfuric acid, and 65 parts of a liberated organic substance was separated by filtration. This organic substance contained, in addition to 3,3'-dicarboxy-triphenyl phosphate, more or less amounts of acetic acid, by-products and intermediary oxidation products. The organic substance was recrystallized from water-ethanol (70 : 30) and then from a large amount of toluene to obtain a white crystal having a melting point of 142° C.

Elementary analysis for $C_{20}H_{15}O_8P$:
Found:      C 58.23%,   H 3.61%,    P 7.47%
Calculated: C 57.98%,   H 3.49%,    P 7.48%

The nuclear magnetic resonance spectrum (in CDCl$_3$) of said crystal showed no presence of unreacted methyl group, and other proton absorptions well substantiated the above-mentioned structure. The acid value of the crystal was 275 (calculated value: 271).

EXAMPLE 4

4,4'-Dimethyl-triphenyl phosphate was oxidized in the same manner as in Example 3. The oxidation reaction liquid was treated in the same manner as in Example 3 to remove acetic acid and cobalt salt formed. The resulting crude organic substance was freed from insoluble impurities by treatment with hot toluene, and was then recrystallized from ethyl acetate to obtain a white crystal having a melting point of 177° C. According to elementary analysis and nuclear magnetic resonance spectrum, it was confirmed that said crystal was 4,4'-dicarboxy-triphenyl phosphate.

Elementary analysis for $C_{20}H_{15}O_8P$:
Found:      C 58.04%,   H 3.48%,    P 7.46%
Calculated: C 57.98%,   H 3.49%,    P 7.48%.

EXAMPLE 5

Tris(3,5-xylyl) phosphate was synthesized from 3,5-xylenol and phosphorus oxychloride. 60 Parts of said phosphate was oxidized with oxygen gas at a temperature of 80° – 85° C. in the presence of 15 parts of cobalt acetate and 200 parts of glacial acetic acid. During the oxidation, acetaldehyde as the promoter was intermittently dropped into the system in a proportion of 2 parts per hour. At about the 3rd hour from initiation of the reaction, the generation of heat began, and stopped at the 9th hour. From about this time, the formation of precipitate initiated. The reaction was ceased at the 12th hour, whereby the amount of unreacted tris(3,5-xyly) phosphate was less than 0.1 percent. The reaction liquid was cooled and filtered to obtain 32 parts of a crude cake. The filtrate was freed from acetic acid by distillation to obtain 70 parts of a residue. The cake was extracted with hot water to remove cobalt salt, acetic acid and other impurities, whereby a slightly greyish white solid was obtained. This solid had a melting point of above 250° C.

The solid was dissolved in 90 parts of a 30 percent aqueous caustic soda solution and was then heated under relux for 20 hours. The reaction liquid was separated by filtration from a slight amount of cobalt hydroxide precipitate and was then acidified to pH 1 by addition of sulfuric acid to deposit a crystal. After cooling the liquid with ice, the crystal was recovered by filtration. The thus obtained crystal was 27 parts in amount, and it was found that the crystal was composed of a 97 : 3 mixture of 5-hydroxy-isophthalic acid and 5-hydroxy-m-toluic acid. This crystal was recrystallized from water to obtain 99.60 percent purity 5-hydroxy-isophthalic acid.

On the other hand, the 70 parts of the vaporization residue of the filtrate was treated in the same manner as in Example 3 to remove cobalt salt, whereby 40 parts of a crude organic substance was obtained. This crude organic substance was treated with toluene to remove acetic acid, whereby a yellowish brown solid was obtained. The solid was then heated under reflux for 20 hours together with a 30 percent aqueous sodium hydroxide solution. Thereafter, a cobalt hydroxide formed was removed at an alkaline pH, 2 parts of 3,5-xylenol was extracted and separated at a neutral pH, and 35 parts of a mixture of 5-hydroxy-isophthalic acid and 5-hydroxy-m-toluic acid was separated by filtration at an acidic pH. This crystal was composed of 75 percent of 5-hydroxy-isophthalic acid, 24 percent of 5-hydroxy-m-toluic acid, and 1 percent of other unobvious components.

EXAMPLE 6

100 Parts of tricresyl phosphate prepared from a 61 : 39 mixture of m-cresol and p-cresol, 20 parts of cobalt acetate tetra aquo-salt and 7 parts of methylethylketone were dissolved in 300 parts of glacial acetic acid, and air was introduced at 110° C. for 20 hours. About equal volume of air to the reaction mixture was introduced every minutes. In this case, the reaction system was a homogeneous phase, but the amount of unreacted tricresyl phosphate was not more than about 0.1 percent. After cooling to 50° C., the reaction liquid was charged with 40 parts of a strongly acidic cation-exchange resin (trade name "Amberlyst 15"), and was stirred at said temperature for 100 minutes, whereby the color of cobalt ion disappeared completely. The resin was separated by filtration, and the filtrate was mixed with acetic acid, which had been used for washing the resin. Subsequently, the acetic acid was removed by distillation from the mixture to obtain 125 parts of a yellow solid. This solid was recrystallized from water-alcohol (1 : 1), whereby 118 parts of a mixture of tricarboxytriphenyl phosphates was obtained. This substance had a melting point between 180° and 200° C. and showed no clear melting point. The acid value of said substance was 366 and the elementary analysis values thereof were as set forth below.

Elementary analysis for $C_{21}H_{15}O_{10}P$:
Found:      C 55.56%,   H 3.41%,   P 6.78%
Calculated: C 55.03%,   H 3.30%,   P 6.76%.

It was inferred that the thus obtained substance was a mixture of 3,3′,3″-tricarboxy-triphenyl phosphate, 3,3′,4″-tricarboxy-triphenyl phosphate, 3,4′,4″-tricarboxy-triphenyl phosphate and 4,4′,4″-tricarboxy-triphenyl phosphate, and contained, in addition thereto, very small amounts of dicarboxylic acids.

EXAMPLE 7

A mixture comprising 100 parts of diphenyl-3,5-xylyl phosphate, 500 parts of glacial acetic acid, 2 parts of cobalt acetate and 70 parts of acetic anhydride was oxidized with oxygen gas at 130° C. under a pressure of 20 Kg/cm². After 1 hour from initiation of the reaction, the absorption rate of oxygen became high and, at the 5th hour, said rate became low. During this period, temperature increase took place due to the heat of oxidation reaction and therefore the system was externally cooled, so that the temperature did not exceed 140° C.

A homogeneous solution formed after completion of the reaction was passed through a tower packed with the cation-exchange resin "Amberlyst 15." The eluted solution and the wash liquid of the packed tower were mixed together, and the mixture was concentrated to recover acetic acid and a small amount of acetic anhydride. Subsequently, 120 parts of the distillation residue was recrystallized from ethyl acetate to obtain 105 parts of purified 3,5-dicarboxy-triphenyl phosphate, m.p. 160° C., acid value 271 (calculated value 271).

EXAMPLE 8

120 Parts of phenylbis(3,5xylyl) phosphate was oxidized at 90° C. in the presence of 900 parts of acetic acid and 9 parts of cobalt acetate. During the reaction, 2 parts per hour of acetaldehyde as a promotor and 10 parts per hour of acetic anhydride as a dehydrating agent were added to the system. The reaction was complete in 13 hours, and a precipitate formed was separated by filtration and the filtrate was treated in the same manner as in Example 6. From the precipitate was obtained by recrystallization 20 parts of a white solid having a melting point of 245.5° C. which was composed essentially of 3,3′,5,5′trate was obtained by recrystallization 110 parts of a solid having a melting point of 225°–230° C. which was composed of a mixture of tetracarboxylic acid, tricarboxylic acid and a small amount of dicarboxylic acid.

EXAMPLE 9

Oxidation reaction was effected in the same manner as in Example 2, and the oxidation reaction liquid was cooled to deposit a crystal. This crystal (dry weight 35 parts) was separated by filtration, and the filtrate was freed from acetic acid by distillation to obtain 30 parts of a residue. The said crystal and residue were mixed together, and the mixture was heated under reflux for 10 hours together with 200 parts of a 30 percent aqueous sodium hydroxide solution. The hydrolysis reaction liquid was filtered to remove manganese hydroxide and was then adjusted to pH 7 by addition of concentrated hydrochloric acid. Thereafter, the liquid was extracted with ethyl acetate to recover 2 parts of p-cresol and more or less amounts of by-products. After the extraction, the aqueous layer was further acidified to pH 1.5, whereby a crystal of p-hydroxybenzoic acid was deposited. This crystal was separated by filtration and was then dried to obtain 49 parts of p-hydroxybenzoic acid.

EXAMPLE 10

100 Parts of tricresyl phosphate prepared from a 61 : 39 mixture of m-cresol and p-cresol, 20 parts of cobalt acetate (tetraaquo-salt) and 7 parts of methylethylketone were dissolved in 300 parts of glacial acetic acid, and air was introduced at 110° C. for 20 hours in a proportion of 60*l* per hour per 1 liter of reaction mixture, whereby the amount of the tricresyl phosphate left in the reaction liquid became about 0.1 percent. Subsequently, the solvent was removed by distillation, and the resulting residue was concentrated to 150 parts. This residue was charged with 350 parts of 20 percent hydrochloric acid and was then allowed to stand with stirring in a closed vessel at 160° C. for 20 hours. The hydrolyzed liquid was cooled and was then filtered to obtain 105 parts of m- and p-hydroxybenzoic acids containing a small amount of tarry substance. Subsequently, the filtrate was extracted with ethyl acetate to recover 3 parts of m- and p-cresols and a more or less amount of acetic acid. In this filtrate, cobalt had been dissolved in the form of chloride. A portion of the filtrate was vaporized to dryness to find that the cobalt chloride could be recovered substantially quantitatively. The crude hydroxybenzoic acid was recrystallized from water-alcohol to obtain 96 parts of a purified product.

EXAMPLE 11

A mixture comprising 50 parts of tris(m-tolyl) phosphate obtained from m-cresol and phosphorus oxychloride and 30 parts of glacial acetic acid was added to a mixture prepared in such a manner that a mixture composed of 10 parts of cobalt acetate (tetraaquo-salt), 200 parts of glacial acetic acid and 3 parts of acetaldehyde was maintained at 90° C. and dry air was introduced into the mixture for 40 minutes to activate a major proportion of the cobaltous salt to a cobaltic salt. Subsequently, the mixture was oxidized at 70° – 75° C. by introduction of air. During the oxidation, 2 parts per hour of acetaldehyde was intermittently dropped into the system. At the 10th hour from initiation of the reaction, the tris(m-tolyl)phosphate substantially disappeared. A crystal deposited was separated by filtration from the reaction liquid. From the filtrate, acetic acid was removed by filtration until the amount of residual liquid became 100 parts. The liquid was allowed to cool and a deposited crystal was again separated by filtration. A mixture of this crystal and the previously separated crystal, the amount of which was 58 parts, was heated under reflux for 20 hours together with 200 parts of 20 percent hydrochloric acid to effect hydrolysis, whereby 47 parts of m-hydroxybenzoic acid was obtained. The cobalt-containing second filtrate was further freed by distillation from acetic acid and was then subjected to hydrolysis at an alkaline pH, and cobalt hydroxide was separated by filtration at an alkaline pH. The cobalt hydroxide was washed 2 times with water to obtain 7 parts of a hydrated cake. This cake was dissolved in glacial acetic acid, and the solution was used in oxidation of the next time. The hydrolyzed filtrate was neutralized and acidified in the same manner as in Example 9 to recover 1 part of m-cresol and 6 parts of m-hydroxybenzoic acid.

What is claimed is:

1. An aromatic carboxylic acid represented by the formula

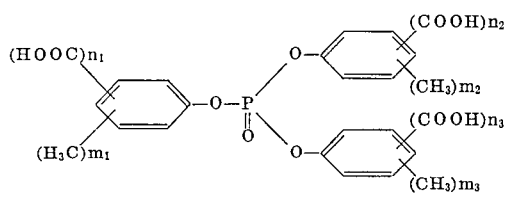

wherein $n_1$, $n_2$ and $n_3$ are individually zero or an integer of up to 2, and $n_1 + n_2 + n_3$ is 2 or more; $m_1$, $m_2$ and $m_3$ are individually zero or an integer of up to 2, and $n_1 + m_1$, $n_2 + m_2$ and $n_3 + m_3$ do individually not exceed 3; and the substituted positions of the carboxyl groups are in the 3-, 4- or 5-positions of individual phenyl groups.

2. 3,3′,3″-Tricarboxy-triphenyl phosphate.
3. 4,4′,4″-Tricarboxy-triphenyl phosphate.
4. 4-Methyl-4′,4″-dicarboxy-triphenyl phosphate.
5. 3,3′-Dicarboxy-triphenyl phosphate.
6. 4,4′-Dicarboxy-triphenyl phosphate.
7. 3,3′,4″-Tricarboxy-triphenyl phosphate.
8. 3,4′,4″-Tricarboxy-triphenyl phosphate.
9. 3,5-Dicarboxy-triphenyl phosphate.